US008055902B2

(12) United States Patent  (10) Patent No.: US 8,055,902 B2
Crichton et al.  (45) Date of Patent: Nov. 8, 2011

(54) METHOD, SYSTEM, AND COMPUTER PROGRAM PRODUCT FOR DATA UPLOAD IN A COMPUTING SYSTEM

(75) Inventors: Joseph M. Crichton, Poughkeepsie, NY (US); Michael P. Zarnick, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 11/622,711

(22) Filed: Jan. 12, 2007

(65) Prior Publication Data
US 2008/0172392 A1  Jul. 17, 2008

(51) Int. Cl.
*H04L 9/18* (2006.01)
(52) U.S. Cl. .................... 713/181; 713/150; 713/168
(58) Field of Classification Search ............... 713/181, 713/150, 168
See application file for complete search history.

(56) References Cited

U.S. PATENT DOCUMENTS

| | | | |
|---|---|---|---|
| 6,339,785 | B1 | 1/2002 | Feigenbaum |
| 6,381,709 | B1 | 4/2002 | Casagrande et al. |
| 6,477,522 | B1 | 11/2002 | Young |
| 2003/0074465 | A1 | 4/2003 | Tang et al. |
| 2003/0084280 | A1 | 5/2003 | Bryan et al. |
| 2003/0088784 | A1* | 5/2003 | Ginter et al. ............ 713/189 |
| 2003/0101446 | A1 | 5/2003 | McManus et al. |
| 2004/0172476 | A1 | 9/2004 | Chapweske |
| 2005/0195660 | A1* | 9/2005 | Kavuri et al. ............ 365/189.05 |
| 2005/0226059 | A1* | 10/2005 | Kavuri et al. ............ 365/189.05 |
| 2006/0023877 | A1* | 2/2006 | Tsuruga ..................... 380/28 |
| 2006/0031537 | A1 | 2/2006 | Boutboul et al. |
| 2008/0062870 | A1* | 3/2008 | Clower et al. ............. 370/230 |

OTHER PUBLICATIONS

"Grid Computing Distribution Using Network Processors", Liljeqvist, et al. Chalmers University of Technology, Sweden.
"The Physiology of the Grid-An Open Grid Services Architecture for Distributed Systems Integration", Foster, et al.; Published on the World Wide Web at: www.globus.org/research/papers/ogsa.pdf.
Venugopal, et al., "A Grid Service Broker for Scheduling E-Science Applications on Global Data Grids", Concurrency and Computation: Practice and Experience, vol. 18, Issue 6, pp. 685-699, Wiley Press, NY, USA, May 2006.
PCT/EP2007/064431—Filed Dec. 21, 2007— PCT ISR/WO.

* cited by examiner

*Primary Examiner* — Edan Orgad
*Assistant Examiner* — Bradley Holder
(74) *Attorney, Agent, or Firm* — Wenjie Li (57) ABSTRACT

A method, system, and computer program product for simultaneous multi-channel upload of a file to one or more servers while ensuring data integrity. A validation scheme employs hashes to allow segments of the data file to be separately validated. Thus, if the upload process is interrupted or otherwise corrupted, segments of previously transferred data which have been transferred correctly may be validated, eliminating the need for re-transmission of that correctly transferred data. Preferably, a grid broker may be incorporated, allowing simultaneous multi-channel upload of data in a grid computing environment.

21 Claims, 10 Drawing Sheets

METHOD, SYSTEM, AND COMPUTER PROGRAM PRODUCT FOR DATA UPLOAD IN A COMPUTING SYSTEM

FIELD OF THE INVENTION

The present invention is related to computer data handling. It is more particularly related to a method, system, and computer program product for simultaneously uploading data via multiple channels.

BACKGROUND OF THE INVENTION

Traditionally, file uploads are made from a single client to a single remote destination computer and are bound by the performance of the network which connects them. For example, throughput using Transmission Control Protocol (TCP) as an underlying transport protocol can be limited by poorly tuned window sizes and high latency.

Grid computing is the virtualization of distributed computing resources such as processing power, networks, bandwidth, and storage capacity to create a single system image, granting users and applications seamless access to vast IT capabilities. A source for more information about grid computing is found in "The Physiology of the Grid—an open grid services architecture for distributed systems integration" by Foster, Kesselman, Nick and Tuecke.

Further information regarding grid computing may be found in a paper entitled "Grid Computing Distribution Using Network Processors" by Llevist and Bengsson. The paper discloses a concept for a new computing model for distribution of both code and data to nodes of a network (grid), wherein the routers of the network determine which nodes should be selected to execute the code based on the knowledge collected by the routers. The subject matter of this document is incorporated herein by reference.

It is known in the prior art to upload data using multiple upload channels. For example, File Transfer Protocol (FTP) and Secure File Transfer Protocol (SFTP) each allow clients to upload portions of a file which enables one to upload the portions concurrently. The concurrent upload, however, requires explicit support in the underlying file system for simultaneous file updates. The client is charged with coordination of the multiple uploads and ensuring the correctness of the uploaded file. For example, the client needs to ensure unique portions of the file are uploaded by each channel, and validation of the upload, if desired, could only be achieved by downloading the entire file and comparing it to the source file. Finally, multi-site file upload would only be possible when the multiple sites are connected to the same file store.

A method, system, and computer program product allowing efficient and reliable simultaneous uploading of data over multiple channels while also providing re-start capability would be desirable.

BRIEF SUMMARY OF THE INVENTION

In a first aspect, the invention is a computer-implemented method for uploading a data file over multiple channels from a client computer to at least one remote destination computer in a computing system. The method comprises steps of communicating an upload request to the client computer. The data file is divided into a plurality of file slots and a plurality of file components. Multiple file slots are simultaneously transferred, each file slot being transferred over one of the multiple channels, to upload the data file from client computer to the at least one destination computer. As the data file is transferred to the destination computer, a destination-side file slot hash is calculated based upon the data in each file slot. A destination-side file component hash is calculated based upon the data in each file component. A destination-side cumulative hash based upon the transferred data file is also calculated. A client-side cumulative hash is calculated based upon the data file resident on the client computer. The destination-side and client-side cumulative hashes are compared to verify integrity of the transferred file. If the client-side and destination-side cumulative hashes fail to match, indicating an error in transmission, then determination is made regarding in which file slot and in which file component the error has occurred, whereby uploading of the data file may be re-started beginning with the file slot and file component containing the error.

In a second aspect, the invention is a computing system for uploading a data file over multiple channels from a client computer to at least one remote destination computer. The computing system comprises a client computer in operative communication with at least one remote destination computer. A data upload coordination product is operative to control communication between the client computer and the at least one destination computer. The data upload coordination product includes means for dividing the data file into a plurality of file slots and a plurality of file components. Furthermore, means are provided for controlling simultaneous transfer of multiple file slots, each file slot being transferred over one of the multiple channels, to upload the data file from client computer to the at least one remote destination computer. The data upload communication product further includes means for calculating, as the data file is transferred to the destination computer, a destination-side file slot hash based upon the data in each file slot, a destination-side file component hash based upon the data in each file component, and a destination-side cumulative hash based upon the transferred data file. Means are included for calculating a client-side cumulative hash based upon the data file resident on the client computer. Means are provided for comparing the destination-side and client-side cumulative hashes to verify integrity of the transferred file. Means are also provided for determining, if the client-side and destination-side cumulative hashes fail to match, in which file slot and in which file component the error has occurred, whereby uploading of the data file may be re-started beginning with the file slot and file component containing the error.

In a third aspect, the invention is a computer program product comprising a computer usable medium having computer readable program code for uploading a data file over multiple channels from a client computer to at least one remote destination computer. The computer program product includes first computer program code for means for dividing the data file into a plurality of file slots and a plurality of file components. Second computer program code means controls simultaneous transfer of multiple file slots, each file slot being transferred over one of the multiple channels, to upload the data file from client computer to the at least one destination computer. Third computer program code means calculates a destination-side file slot hash based upon the data in each file slot, a destination-side file component hash based upon the data in each file component, and a destination-side cumulative hash as the data file is transferred from the client computer to the destination computer. Fourth computer program code means calculates a client-side cumulative hash based upon the data file resident on the client computer. Fifth computer program code means compares the destination-side and client-side cumulative hashes to verify integrity of the transferred file. Sixth computer program code means determines, if the client-side and destination-side cumulative hashes fail to match, in which file slot and in which file component the error has occurred, whereby uploading of the data file may be re-started beginning with the file slot and file component containing the error.

BRIEF DESCRIPTION OF THE SEVERAL VIEWS OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The present invention relates to a method, system, and computer program product for simultaneous multi-channel upload of a file to one or more servers while ensuring data integrity. A validation scheme employs hashes to allow segments of the data file to be separately validated. Thus, if the upload process is interrupted or otherwise corrupted, segments of previously transferred data which have been transferred correctly may be validated, eliminating the need for re-transmission of that correctly transferred data. The present invention may be utilized to support simultaneous multi-channel upload to either a single upload site, or with the incorporation of a grid broker, to multiple upload sites in a grid computing environment.

Rather than using traditional/client computer or peer-to-peer models, this invention uses the model of service providers, consumers and brokers. The broker has the responsibility of providing the roadmap of the service, securing the applications and maintaining records. The consumer can contact the service providers and receive service from them only after obtaining the necessary authorization and credentials from the broker. Moreover, the broker may direct the consumer to receive service from multiple service providers concurrently. In the context of the upload grid, the broker is implemented as a management service, the service producers are implemented as upload servers and the consumers are implemented as client agents. The agents initiate and process file uploads on behalf of end users. This model can be applied to a variety of grid applications.

If utilized in a grid computing environment, the upload grid needs to be scalable, reliable, secure, adaptable and efficient. Specifically:

Scalability: The present invention should utilize any set of resources that belongs to a grid. The upload grid uses a dynamic set of upload servers. Therefore, the present invention is scalable.

Reliability: Rather than relying on a single server, the upload grid has many servers. A failure of an individual server will not disable the upload service. Therefore, the present invention is reliable.

Security: The present invention uses standard Lightweight Directory Access Protocol (LDAP) for client authentication and Secure Socket Layer/Transport Layer Security (SSL/TLS) for both transport security as well as server validation. Therefore it is secure.

Adaptability: The upload grid can dynamically allocate portions of a file to be uploaded from multiple client agents concurrently to multiple servers of the grid. The present invention is adaptable as the allocation is based on the perceived performance of each particular server.

Efficiency: The management service controls which subset of resources can be utilized for a particular upload. It performs this selection with the objective of maximizing upload through-put while balancing the overall usage of the network resources (bandwidth usage). Therefore the present invention is efficient.

Figure 1:
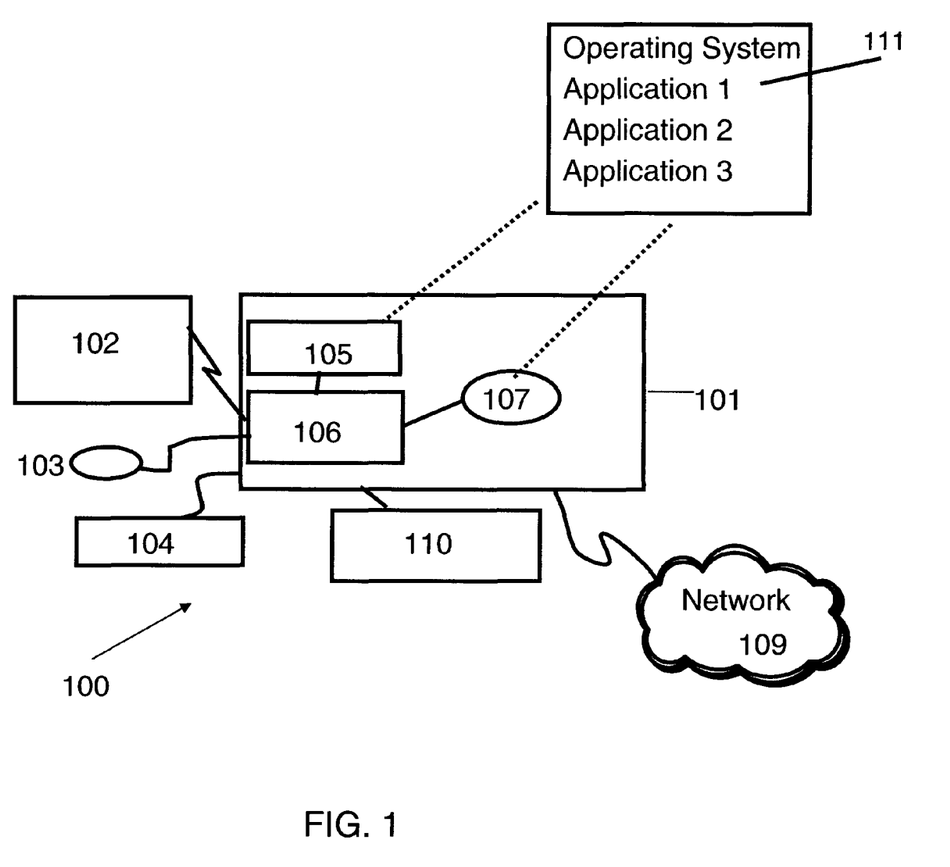
FIG. 1 is a schematic representation of a conventional computer system known in the prior art.

FIG. 1 illustrates a representative workstation or server hardware system 100, known in the prior art, in which the present invention may be practiced. The system 100 of FIG. 1 comprises a representative computer 101, such as a personal computer, a workstation or a server, including optional peripheral devices. The computer 101 includes one or more processors 106 and a bus employed to connect and enable communication between the processor(s) 106 and the other components of the system 100 in accordance with known techniques. The bus connects the processor 106 to memory 105 and long-term storage 107 which can include a hard drive, diskette drive or tape drive for example. The computer 101 might also include a user interface adapter, which connects the microprocessor 106 via the bus to one or more interface devices, such as a keyboard 104, mouse 103, a printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The computer 101 may communicate with other computers or networks of computers by way of a network adapter capable of communicating with a network 109. Example network adapters are communications channels, token ring, Ethernet or modems. Alternatively, the computer 101 may communicate using a wireless interface, such as a CDPD (cellular digital packet data) card. The computer 101 may be associated with such other computers in a Local Area Network (LAN) or a Wide Area Network (WAN), or the computer 101 can be a client in a client/server arrangement with another computer, etc. All of these configurations, as well as the appropriate communications hardware and software, are known in the art.

Figure 2:
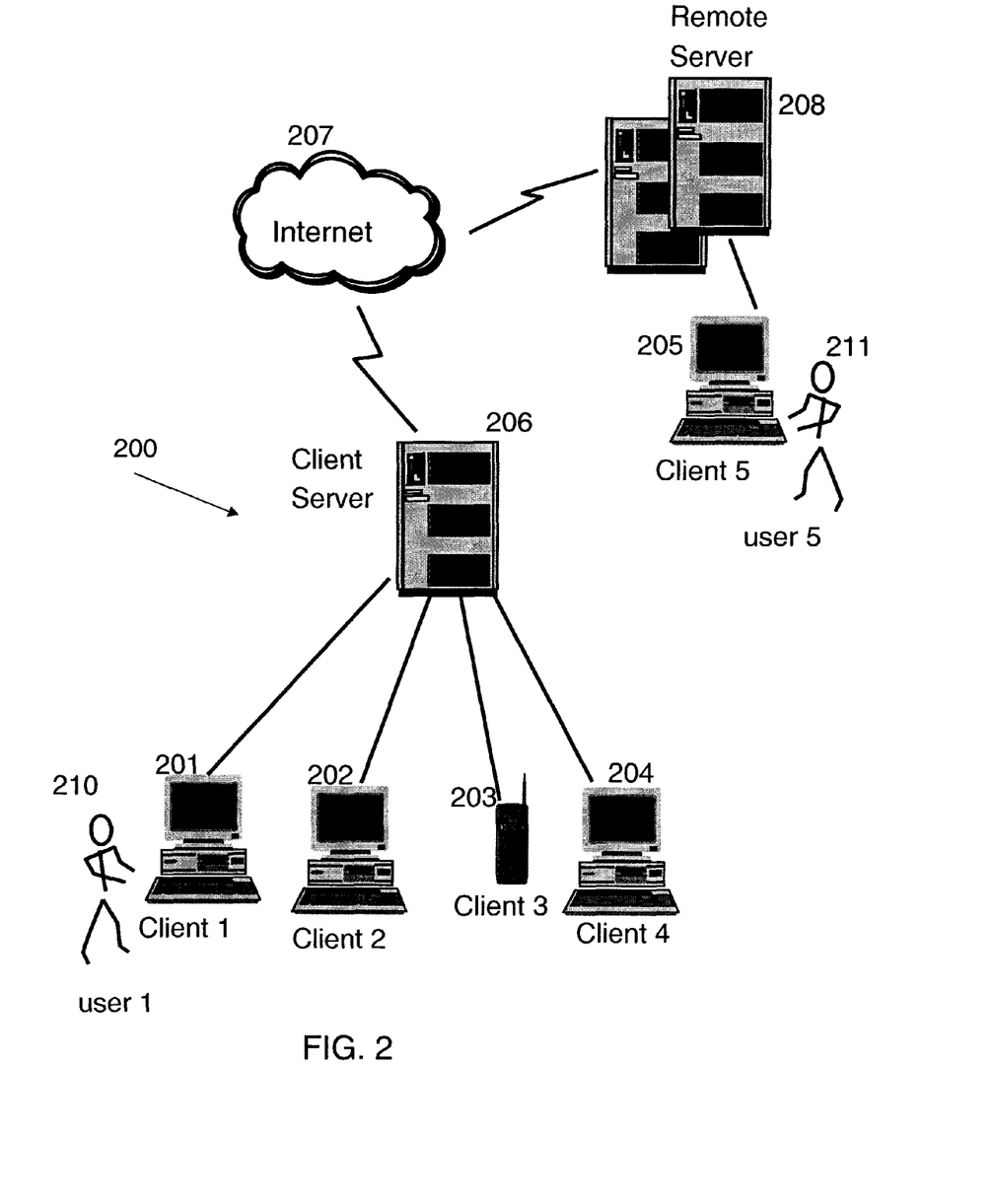
FIG. 2 is a schematic representation of a client/server network known in the prior art.

FIG. 2 illustrates a data processing network 200, known in the prior art, in which the present invention may be practiced. The data processing network 200 may include a plurality of individual networks, such as a wireless network and a wired network, each of which may include a plurality of individual workstations 101. The network 200 may further comprise a plurality of individual client computers 201-205, accessible to users 210 and 211. Additionally, as those skilled in the art will appreciate, one or more LANs may be included, where a LAN may comprise a plurality of intelligent workstations coupled to a host processor.

Still referring to FIG. 2, the networks may also include mainframe computers or servers such as a gateway computer (client computer 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway computer 206 may also be directly coupled to one or more workstations 101 using a communications link. The gateway computer may be implemented utilizing an eServer™ z900 Server available from International Business Machines Corporation of Armonk, N.Y.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In the preferred embodiment, the present invention is implemented as one or more computer program products. The implementation of the software of the present invention may operate on a user's workstation, as one or more modules or applications (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

Figure 3:
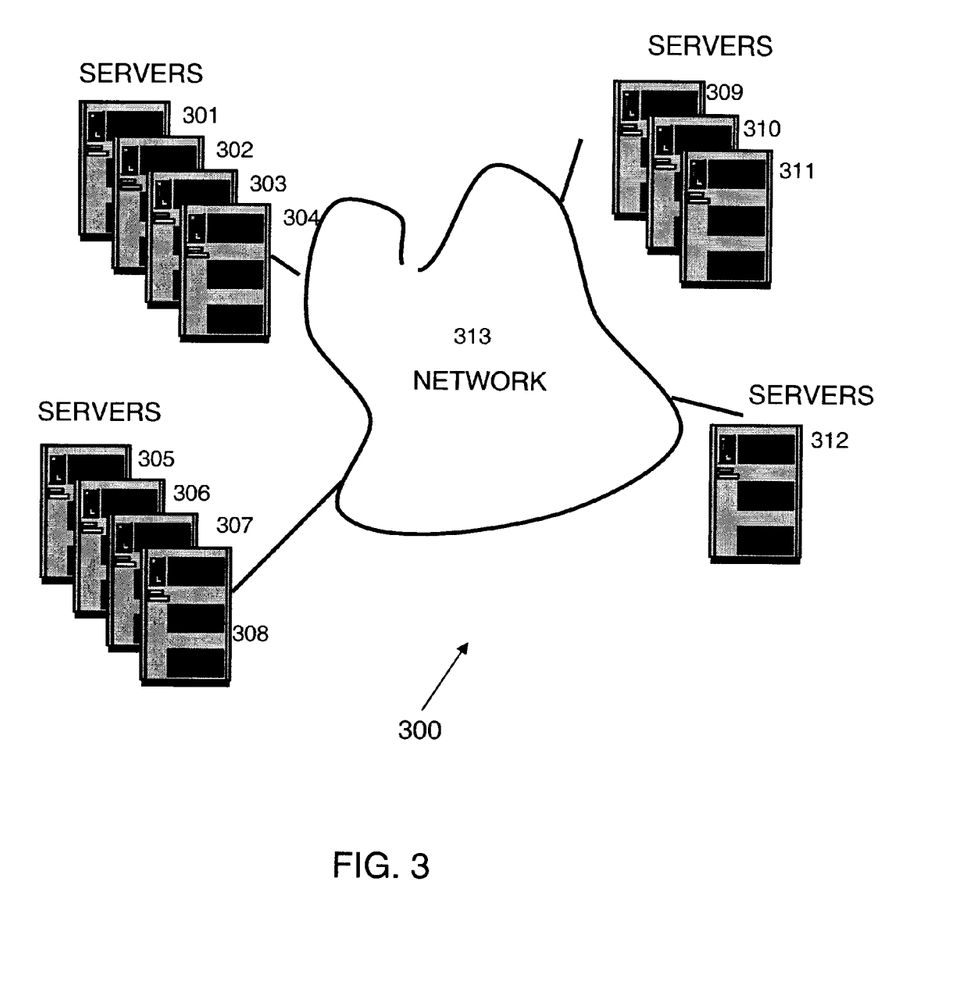
FIG. 3 is a schematic representation of a grid computing network known in the prior art.

FIG. 3 shows a high level representation of a prior art grid structure of Servers 301-312 communicating via a network fabric 313. Server 309 is connected with servers 310 and 311 by a local network. Server 308 provides Grid Broker services. The concept of a Grid Broker is discussed in "A Grid Service Broker for Scheduling e-Science Applications on Global Data Grids", Venugopal et al., Concurrency and Computation: Practice and Experience, May 2006, the subject matter of which is incorporated herein by reference.

Figure 4:
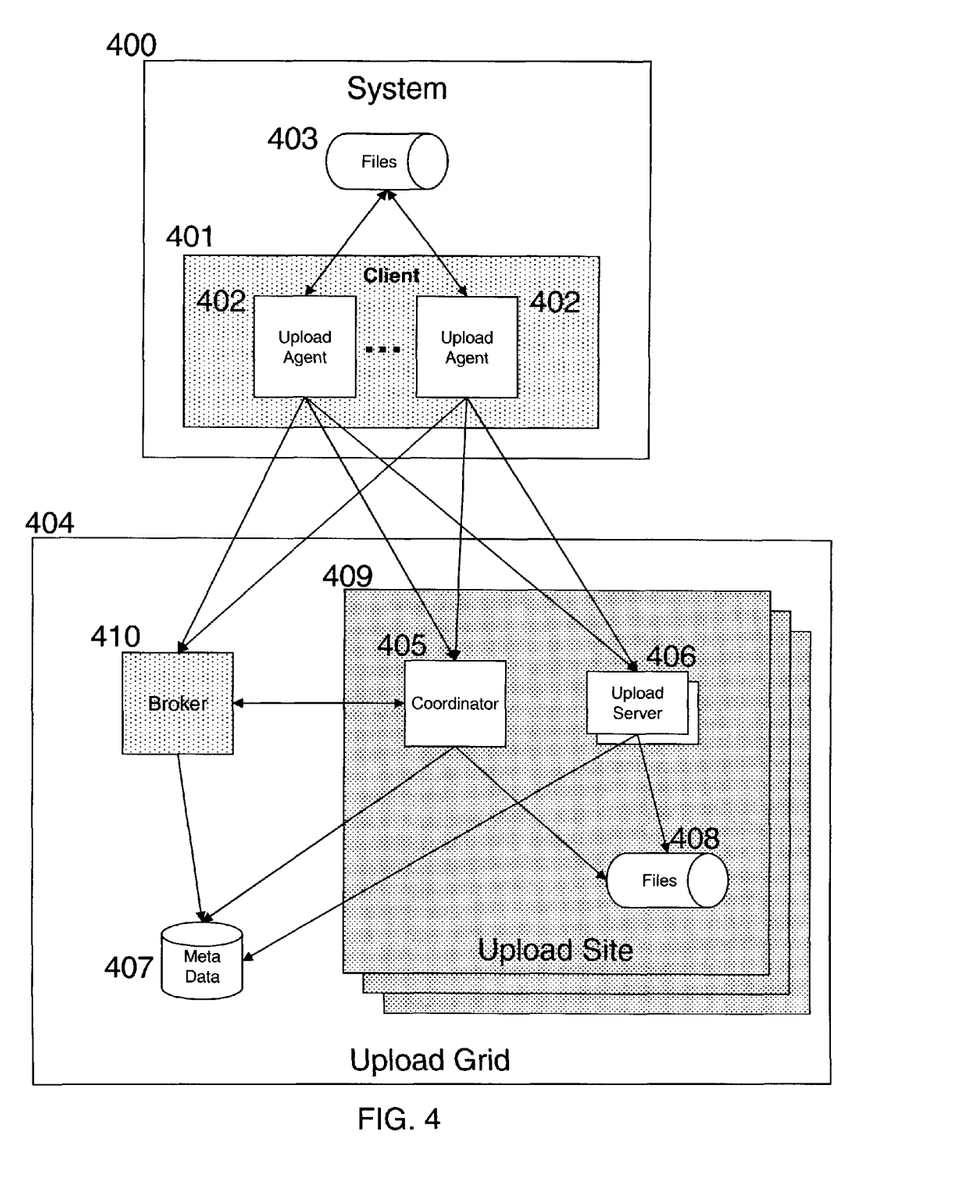
FIG. 4 is a schematic representation of a high level architecture of an upload grid in accordance with the present invention.

FIG. 4 depicts the high-level architecture of the upload grid system 404. Using a tiered architecture, the upload grid 404 contains one or more upload sites 409 (each upload site 409 comprising one or more destination computers), a metadata database 407 and preferably a broker module 410. Each upload site contains a coordinator module 405, one or more upload server modules 406 and a file repository 408. The upload servers 406 are registered with the coordinator 405. The coordinator 405 of each site is registered with the broker 410. The broker 410 provides base services such as authentication, file declaration, upload site choreography and load balancing for the upload grid 404. The coordinator 405 provides base services such as authentication, file declaration, upload choreography and load balancing for the upload site 409 as well as intermediate services for the broker 410 at each upload site such as component management and data hash management. In a representative implementation, the client 401 preferably utilizes a plurality of upload agents 402 which work together to upload a file to the upload grid 404. The broker 410 defines for each upload agent 402 the portion of the file to upload as well as the upload site 409 to use. The coordinator 405 may deny an upload agent 402 for load balancing purposes. The upload agents 402 may be distributed across one or more systems 100 (FIG. 1). The reference implementation defines each upload agent 402 as a separate thread of execution on a given client system 400.

In operation, the client 401 contacts the broker 410 for base services and is directed to a specific upload site 409 for upload services. Once directed to an upload site 409, the client 401 may contact the coordinator 405 at that site or alternatively, the broker 410 may be used for base services. The coordinator 405 defers to the broker 410 for base services in the implementation illustrated in FIG. 4. A representative implementation might choose to use a single site. In this case, the functions of the coordinator 405, upload server 406, and broker 410 might be combined into a single module.

Some services of the broker 410 and coordinator 405 may be implementation specific. In one preferred implementation, a single upload site 409 is used. The broker 410, coordinator 405, and upload servers 402 are implemented as web services. Correspondingly, web server middleware provides the authentication and load balancing services.

Figure 5:
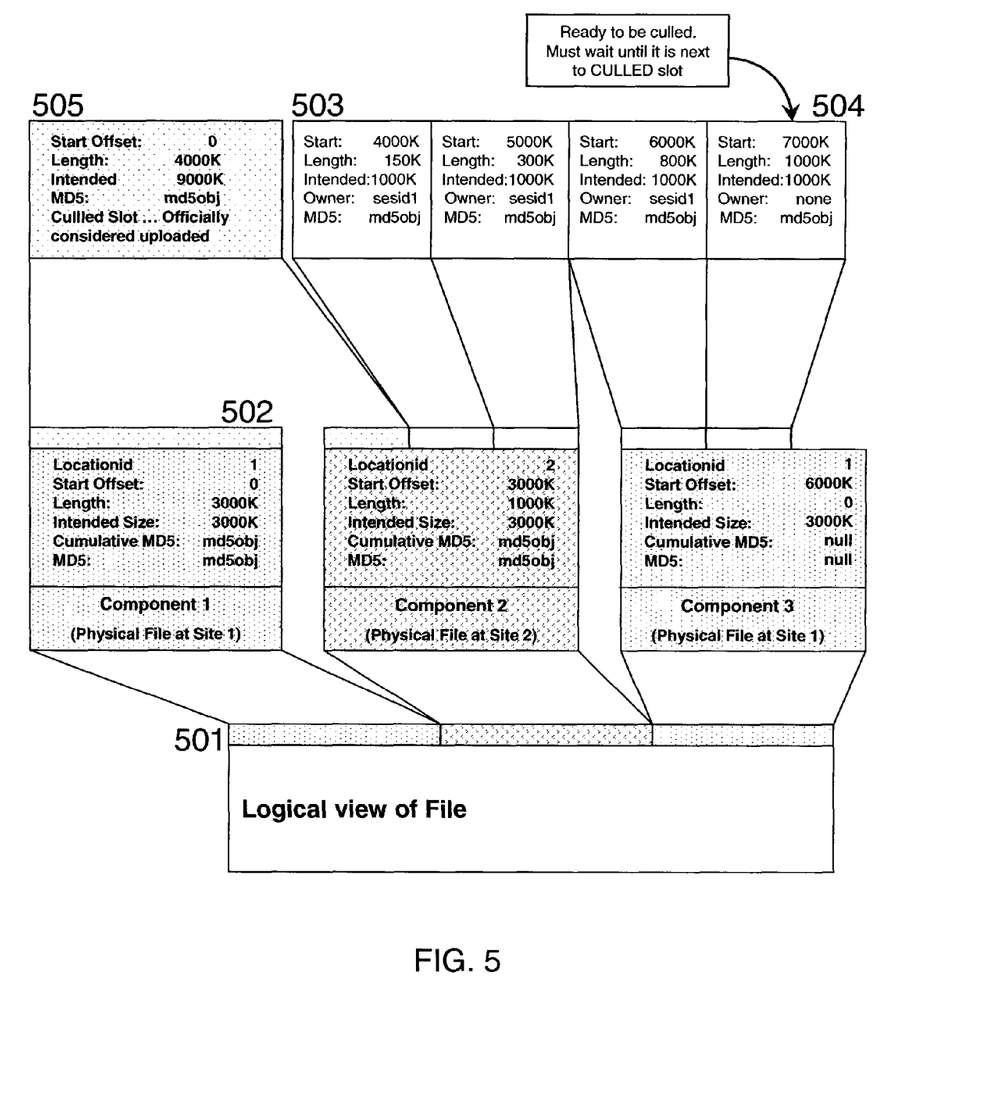
FIG. 5 is a schematic representation of division of a file to be uploaded into file components and file slots in accordance with the present invention.

With reference now to FIG. 5, the structure of the metadata and file data on the upload grid is illustrated. The file data 501 is physically divided into file components 502 which contain portions of the file. Components 502 are set to a fixed size as determined by the configuration of the upload grid. The components 502 for a file are an ordered set. Given their fixed size and order, the data at an offset in the file is precisely located in a specific component 502.

Each component 502 of a file has two restart-capable hash objects (preferably, MD5) associated with it. A cumulative MD5 hash is based upon the contents of the entire file, including all the culled data in the component, while the second restart-capable hash is the MD5 hash based on the contents of the component 502 itself. The use of MD5 hashes is not a limitation of this invention. Any conventional suitable hash could be used, but the restart-capable nature is prescribed for performance reasons.

Components 502 are divided by the broker 410 into file slots 503. Each file slot, or slot 503, references a segment of the file as defined by the starting offset and intended length. As with the components 502, for each individual slot 503 a restart-capable hash object (preferably an MD5 hash) is calculated based on the data in that slot 503.

A slot 503 is filled sequentially from lowest to highest offset, and is a complete slot 504 when the length of data uploaded equals the intended size of the slot. The slot for file offset zero is known as the culled slot 505. Completed slots 504 which are adjacent to the culled slot 505 are merged into the culled slot 505 and the cumulative MD5 hash is updated. This culled slot 505 is stored as part of the file metadata. When all of the file data has been uploaded, there will be one completed slot, corresponding to the culled slot 505.

Components 502 allow the upload grid 404 to accept files of arbitrary size. Components 502 prevent the underlying file store from imposing its limitations on the users of the upload grid 404.

Multi-channel upload requires concurrent access support in the file store. For file stores which lack concurrent access, slots 503 and components 502 are made equivalent in size. This concurrent access requirement is overcome, as each slot 503 is written to its own file.

Figure 6:
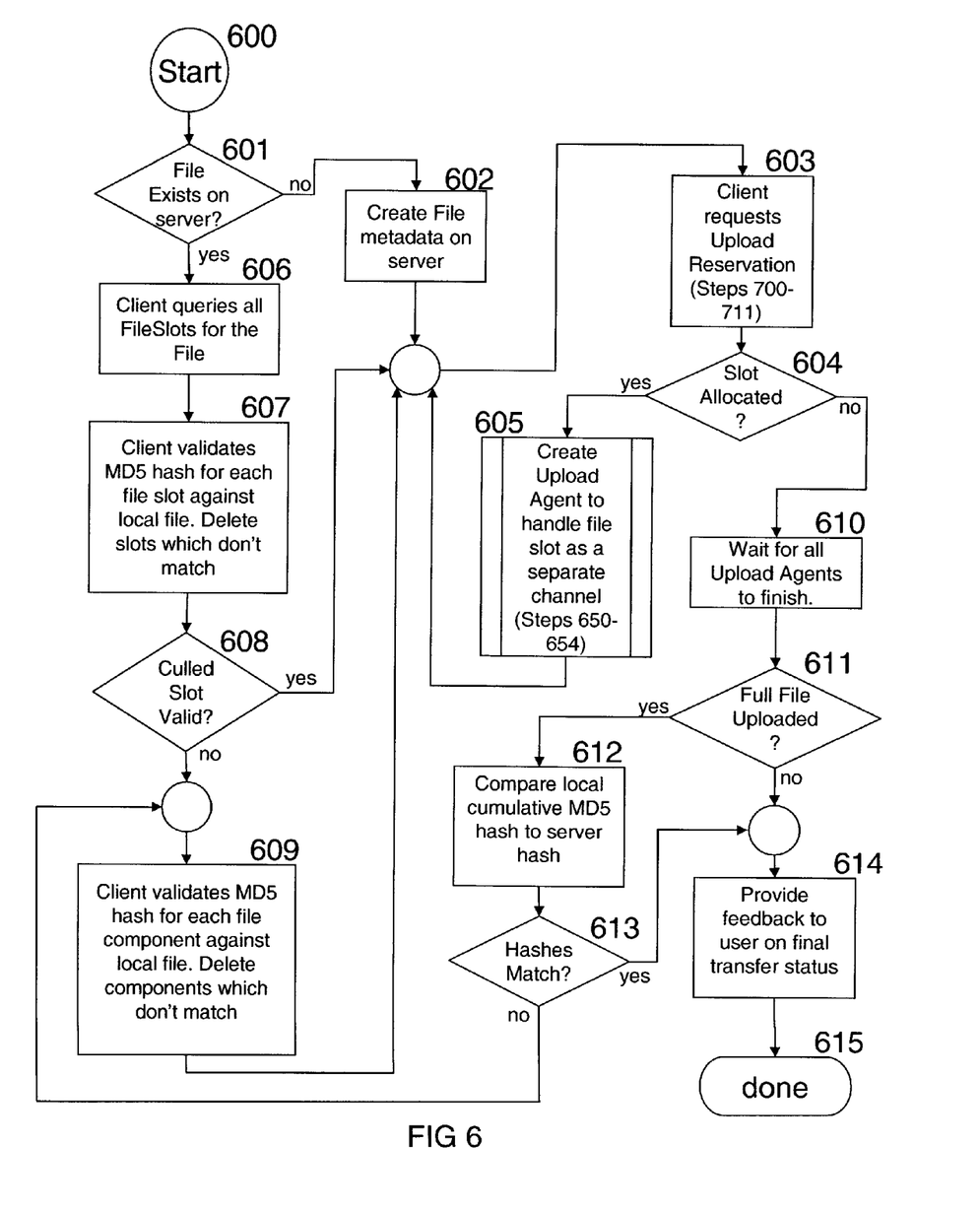
FIG. 6 is a flowchart illustrating a method of uploading a file by a client in accordance with the present invention.

With reference now to FIG. 6, a preferred method of uploading a data file over multiple channels from a client computer 400 to at least one destination computer is illustrated. The client 401 first initiates a session with the broker 410 in a step 600. In a step 601, it is determined if the file to be uploaded already exists. Preferably, this determination is made by checking whether metadata associated with the file to be uploaded exists on the metadata database 407 by contacting the broker 410.

Provided the file does not exist, in a step 602 the client 401 requests that the broker 410 create the file metadata on the metadata database 407. The broker 410 creates the metadata entry for the file. The metadata includes the file name, intended size, timestamp and empty MD5 hash. At this point in the process, there are zero defined slots.

Then in a step 603, the client 401 requests an upload reservation, or slot, from the broker 410. The slot 503 defines a segment of the file as a starting offset and length, as well as the site were the segment will be stored. Step 603 comprises steps 700-711 (see FIG. 7), described in detail herein below.

In a step 604, determination is made whether the broker 410 has provided a slot 503. If the broker 410 has provided a slot 503, then in a step 605 the client 401 creates an upload agent 402 to handle the data transfer for the slot 503 as a separate channel. The upload agent 402 is a separate thread of execution which runs in parallel with the client 401. Once the upload agent 402 is created, the client 401 continues to step 603 to attempt to create additional channels. The upload agent begins at step 650 (see FIG. 6A) and comprises steps 900-904 (see FIG. 9) (via step 651) and steps 700-711 (see FIG. 7) (via step 652).

If the broker 410 does not provide a slot in response to the upload reservation request, then in a step 610 the client 401 concludes that no additional channels are possible. The client 401 waits for all of the existing channels to finish.

In a step 611, determination is made of whether the full file is completely uploaded. If the file has not completely uploaded, then in a step 614 the client 401 provides feedback to the user to indicate the final transfer status. No additional work is required and the process terminates in a step 615.

If it is determined in step 611 that the full file is completely uploaded, then in a step 612 the client 401 compares cumulative MD5 hash calculated based upon the file stored locally on the client 401 to the cumulative MD5 hash calculated by the destination computer based on the transferred data and provided to the client 401 by the broker 410.

In a step 613, determination is made whether the local cumulative MD5 hash matches the cumulative MD5 hash calculated based on the transferred data. If the two MD5 hashes match, then the client provides feedback to the user to indicate the final transfer status (step 614) and no additional work is required (step 615).

If the local and server MD5 hashes do not match, then in a step 609, the client 401 validates the data for each component 502, comparing the component-specific hash calculated based on the file stored locally on the client 401 to the component-specific hash calculated based on the file component data transferred to the upload site 409 and provided to the client 401 by the broker 410. If the two component-specific MD5 hash values are equal, then data contained in the transferred component 502 is the data from the local file and the transferred component 502 is valid. If the MD5 values are not equal, the transferred component 502 is not valid and the broker 410 is asked to delete the component 502. After all components 502 have been validated, the client 401 continues to step 603, to re-start the upload reservation process.

Returning to step 601, if the file already existed, then in a step 606 the client 401 requests all slots 503 for the file from the broker 410. Each slot 503 contains the starting offset and length, and a slot-specific MD5 hash for the data contained in the slot 503.

In a step 607, the client 401 validates the data for each slot 503. That is, the local file (resident on the client 401) is used to generate the MD5 hash for each slot and each slot-specific MD5 hash is compared to the corresponding MD5 hash provided by the broker 410, calculated based on the data contained in the transferred slots 503. If a given set of MD5 values are equal, the data contained in the corresponding slot 503 is the data from the local file and the slot 503 is valid. If a given set of MD5 values are not equal, the slot 503 is not valid and the broker 410 is asked to delete the data for the relevant slot 503.

In a step 608, validity of the culled slot 505 is determined. If the culled slot is determined to be valid (using the same MD5 hash comparison described above, using cumulative hashes calculated based on data corresponding to that data which has been transferred and culled), then the client 401 proceeds to step 603 and begins the upload reservation process.

If the culled slot is not valid, the client validates the data for each component 502 in step 609. As discussed above, in step 609, the local file is used by the client 401 to generate the MD5 hash for each component 502 and is compared to the corresponding MD5 hash provided by the broker 410. If the MD5 values are equal, the data contained in the component 502 is the data from the local file and the transferred component 502 is valid. If the MD5 values are not equal, the component 502 is not valid and the broker 410 is asked to delete the component 502. The client 401 is then directed to step 603, to begin the upload reservation process.

The culled slot 505 is the completed front portion of the file and is represented by a single MD5 hash. When the culled slot 505 is not valid, it could be deleted, but that might discard a large amount of data. By retaining MD5 hashes for the components 502 that comprise the culled slot 505, the client 401 may be able to salvage portions of the completed file. If a component 502 is deleted from the culled slot 505, all components 502 which follow the deleted component must have their cumulative MD5 hash invalidated. By selecting "reasonably sized" components, multiple integrity checkpoints requiring minimal server resource are made available to the client 401.

The method of the presently preferred process embodiment discussed above and illustrated in FIG. 6 describes the client relationship with the upload grid 404. There are many variations to achieve multiple upload channels. The reference implementation creates a separate thread of execution on the system 400 when a slot is provided (as determined in step 604) and immediately repeats the request for an upload reservation, step 603. It continues to create separate threads of execution until the broker 410 refuses to provide an upload reservation. The individual threads of execution upload the slot data (step 605), and then request a new reservation (step 603). As an alternate approach, multiple instances of said client 401 could be executed for the same file on the same system or other systems. One instance would successfully create the file on the system. The other instances would see the file as already existing. All instances would then upload portions of the file. The broker 410 would control how many instances were allowed by eventually refusing an upload reservation to future instances.

Figure 6A:
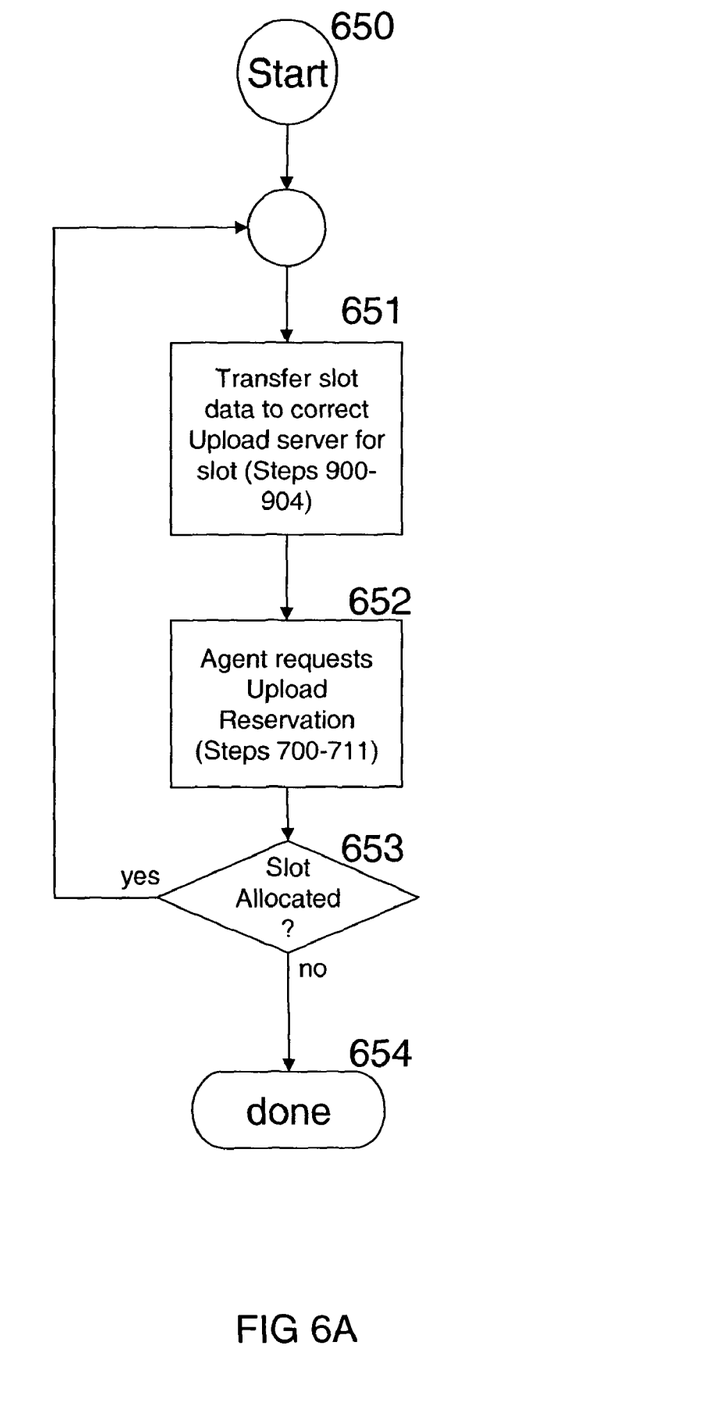
FIG. 6A is a flowchart illustrating a process, contained within the method of FIG. 6, for managing the data transfer by the upload agents.

With reference now to FIG. 6A, the preferred process that the upload agent uses to manage an upload channel is illustrated.

Figure 9:
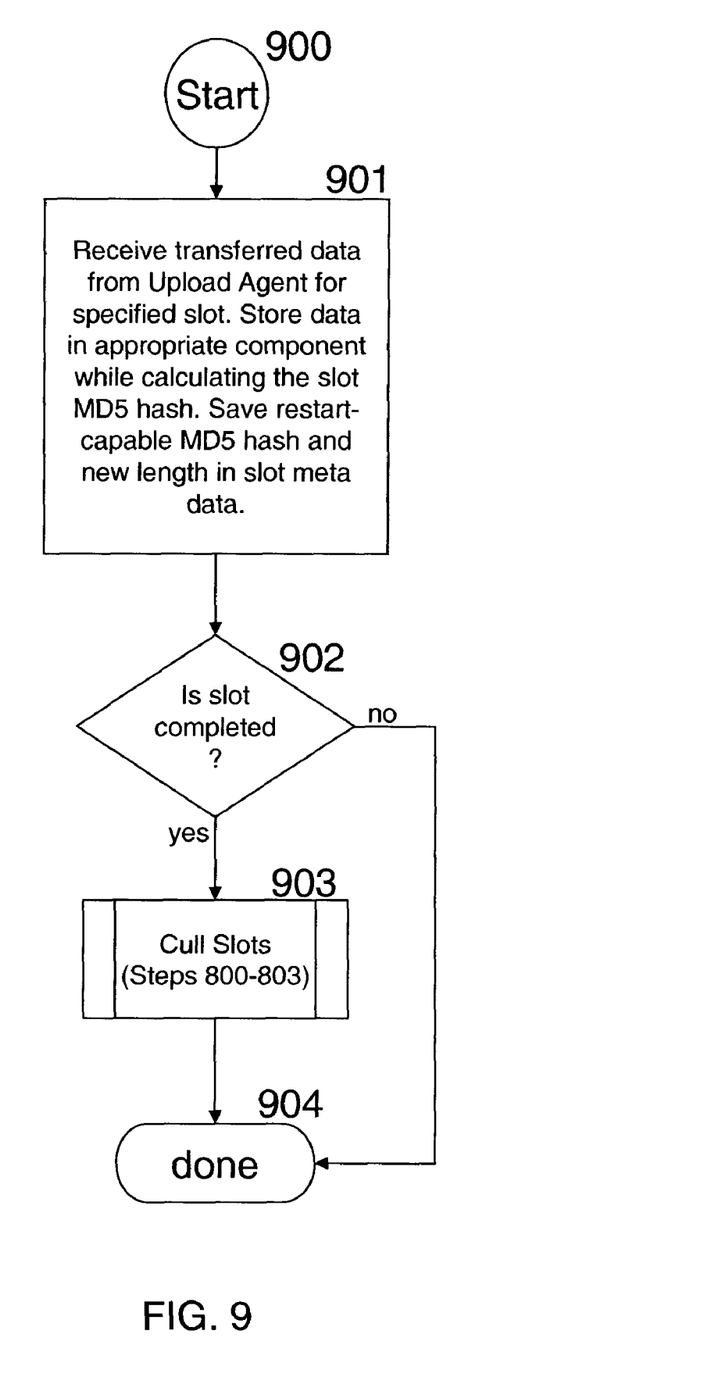
FIG. 9 is a flowchart illustrating a process, contained within the method of FIG. 6, for receiving slot data by the upload server.

In step 651, the upload agent 402 uploads the portion of the file defined by the slot 503. Step 651 comprises steps 900-904, discussed further herein below.

In step 652, when step 651 is finished, the upload agent 402 requests another upload reservation, or slot 503, from the broker 410.

In step 653, determination is made whether the broker 410 has provided a slot 503. If a slot 503 has been provided, the upload agent 402 iterates to step 651 to upload the new portion of data.

If the broker 410 does not provide a slot 503, the upload agent 402 determines that no additional work is required and in step 654 terminates the 650-653 thread of execution. The client 401 will be waiting at step 610 for all previously created upload agents 402 to terminate.

Figure 7:
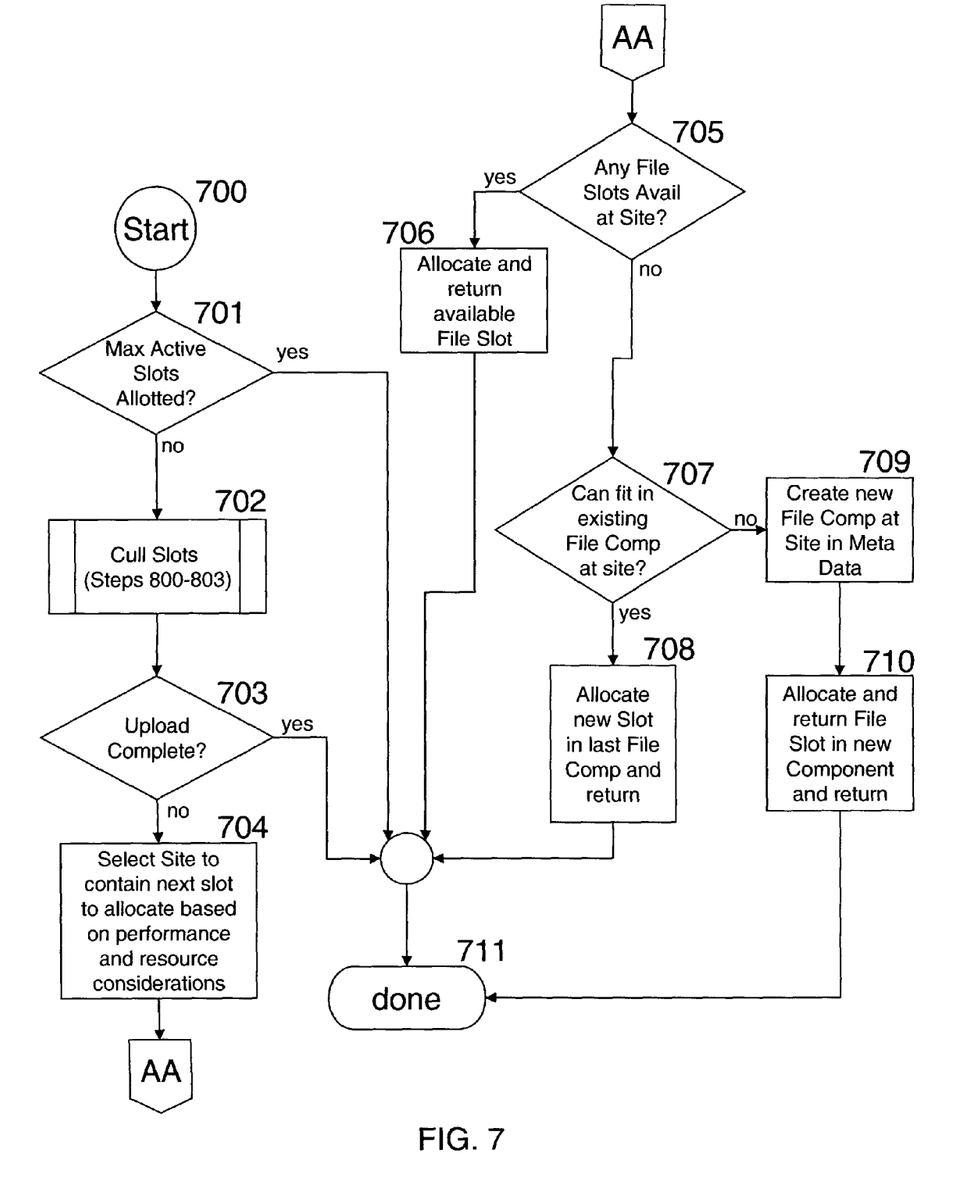
FIG. 7 is a flowchart illustrating a process, contained within the method of FIG. 6, for allocating file slots.

With reference now to FIG. 7, the slot management provided by the broker 410 when the client 401 or upload agent 402 begins with a step 700 requesting an upload reservation.

In a step 701, the broker 410 determines whether the maximum number of active slots permitted has been allocated. If the maximum number of active slots for the file is reached, then no slot is returned, and the broker 410 proceeds to a step 711 terminating the sub-process and returning operation to step 603 or step 652 (whichever step is the source of the request in step 700). The maximum number of active slots limits the number of simultaneous upload channels. The maximum is dynamic and helps to balance both network and computational resources while avoiding client abuse.

Figure 8:
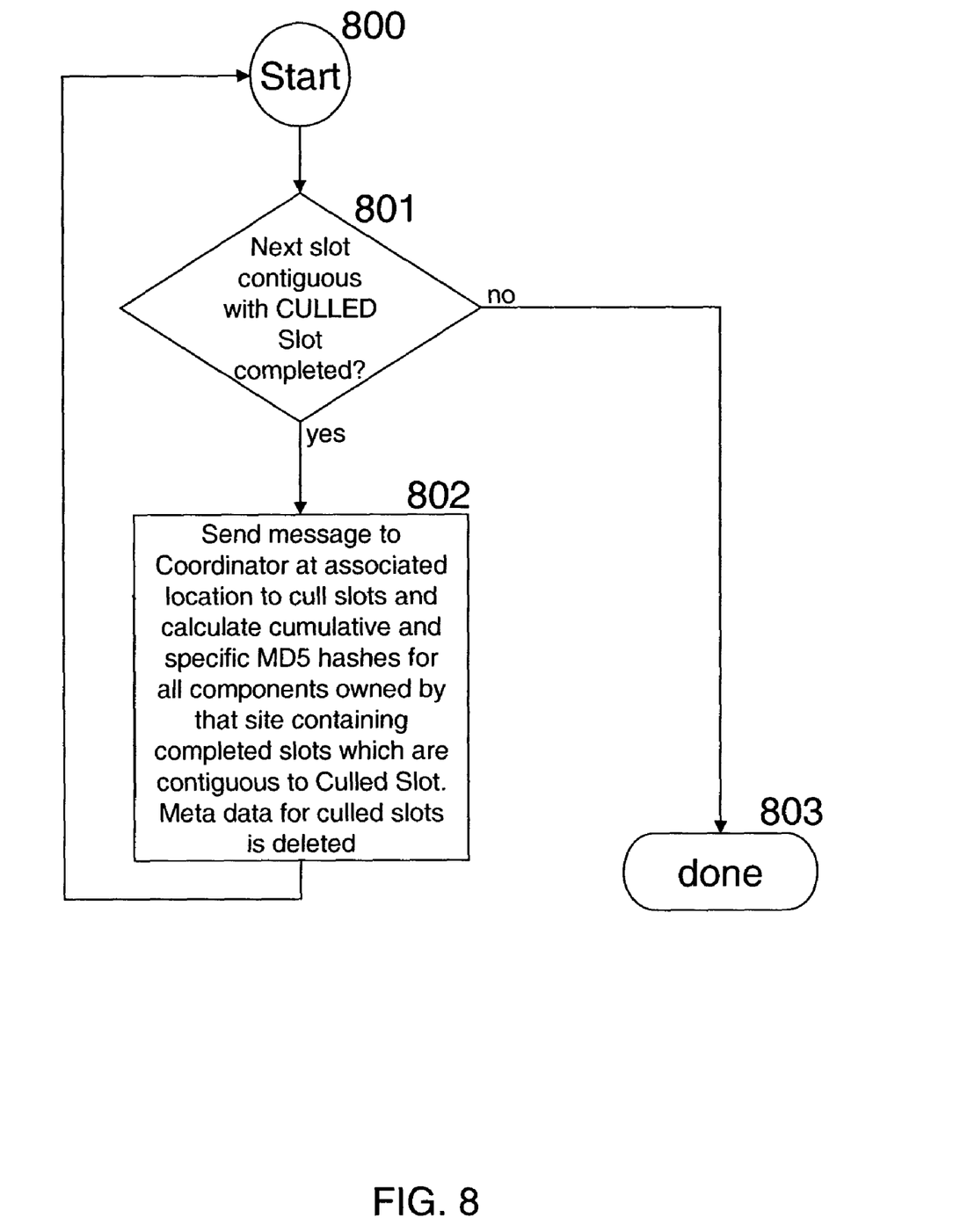
FIG. 8 is a flowchart illustrating a process, contained within the method of FIG. 6, for culling file slots.

If the maximum number of active slots for the file is not reached, in a step 702 the broker 410 culls the completed slots 503. Step 702 comprises steps 800-803. The culling process is described further herein below.

In a step 703, determination is made whether the upload process is complete. If, after culling completed slots, the file is determined to be complete, then no slot is returned and the process proceeds to the termination step 711.

If the file is not complete, then in a step 704 the broker 410 determines the appropriate site 409 to contain the new slot. The broker 410 determines the best site 409 for the slot 503 by consulting metadata to best balance performance and available resources.

In a step 705, the broker 410 checks for already defined, but unallocated slots 503 at the selected site 409. A slot 503 whose lease has expired is considered unallocated. Clients 401 can also release a slot explicitly. The lease allows the server to reclaim an allocated slot when the client 401 has abandoned it. For example, the client 401 has terminated abnormally or a network failure has occurred.

If an unallocated slot exists, then in a step 706 the broker 410 allocates it to the client 401 and sets its lease duration, and returns the slot. Operation proceeds to the termination step 711.

If no slots 503 are available based on the query of step 705, then in a step 707 a query is made as to whether the components 502 for the file have one or more regions that have not been allocated. If so, then in a step 708 a new slot 503 is created and returned and the process proceeds to the termination step 711. The reference implementation defines the new slot by selecting the smallest file offset that is not yet represented by the culled slot or any existing slots. This technique limits the number of slots which need to be retained by the metadata, although other slot allocation schemes could be used.

If the components 502 for the file (at the site 409) have no unallocated regions, then in a step 709 a new component 502 is created, and in a step 710 a new slot 503 is also created and returned and the process proceeds to the termination step 711.

With reference to FIG. 8, the slot culling process begins with an initial step 800, wherein operation is directed from either step 702 (described further above) or step 903 (described further below).

In a step 801, determination is made regarding whether the slot 503 adjacent to the culled slot 505 is completed. If yes, then in a step 802 the broker 410 instructs the coordinator 405 which causes the adjacent slot to merge into the culled slot 505. The coordinator 405 is able to cull all remaining contiguous slots which are completed at the site. The MD5 hash state of the culled slot 505 as it exists with the addition of each slot 503 is stored as metadata. Thus, as each subsequent slot 503 is added to the culled slot 505, the MD5 hash state is merely updated from the previous culled slot endpoint to incorporate the information associated with the newly added slot 503, rather than a new MD5 hash state being repeatedly calculated for the entire culled slot 505. When the coordinator 405 is finished culling completed slots, the broker 410 iterates, continuing to step 800.

If the slot adjacent to the culled slot is not complete, then culling is completed and in termination step 803, operation is returned to step 702 or step 903, as appropriate.

With reference now to FIG. 9, step 651 comprises steps 900-904, and initiates a step 900. In a step 901, the upload server 406 receives the slot information and the data for the slot 503. The data is stored in the appropriate component 502. As the data is stored, the MD5 hash of the slot is calculated. When the data is stored, the restart-capable slot-specific MD5 hash and the new length are saved in the slot metadata.

In a step 902, determination is made of whether transfer of the slot 502 is completed. If not, then operation proceeds to a termination step 904, which returns to step 651.

If transfer of the slot 503 is completed, in a step 903 the broker 410 attempts to cull the slots 503. Step 903 comprises the cull process, steps 800-803. When the culling is finished, termination step 904 returns operation to step 651.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is "reserved" to all changes and modifications coming within the scope of the invention as defined in the appended claims.

That which is claimed is:

1. A computer-implemented method for uploading a data file over multiple channels from a client computer to at least one remote destination computer in a computing system, the method comprising the steps of:
    communicating an upload request to the client computer;
    dividing the data file into a plurality of file components, each file component comprising one or more file slots, wherein each said file component having a restart-capable cumulative hash and a restart-capable hash and each file slot having a restart-capable hash;
    simultaneously transferring multiple file slots, each file slot being transferred over one of the multiple channels, to upload the data file from client computer to the at least one destination computer;
    as the data file is transferred to the destination computer, calculating, based on the data file transferred to the destination computer, a destination-side file slot hash based upon the data in each file slot, a destination-side file component hash based upon the data in each file component, and a destination-side cumulative hash based upon the transferred data file;
    calculating a client-side cumulative hash based upon the data file resident on the client computer;
    and comparing the destination-side and client-side cumulative hashes to verify integrity of the transferred file, wherein if the client-side and destination-side cumulative hashes fail to match, indicating an error in transmission, then determining in which file slot and in which file component the error has occurred, whereby uploading of the data file is operable to be re-started beginning with the file slot and file component containing the error.

2. The computer-implemented method of claim 1, wherein the step of determining in which file slot and in which file component the error has occurred includes comparison of the destination-side file component hash and the destination-side file slot hash with a client-side file component hash and a client-side file slot hash, respectively.

3. The computer-implemented method of claim 1, further comprising a step of providing a grid broker to coordinate transfer of the data file among multiple remote destination computers.

4. The computer-implemented method of claim 1, further comprising a step of generating a culled slot corresponding to adjacent transferred data, wherein calculation of the destination-side cumulative hash is performed using the data corresponding to the culled slot.

5. The computer-implemented method of claim 4, further comprising a step of saving the destination-side cumulative hash state as metadata.

6. The computer-implemented method of claim 1, wherein the steps are implemented using multiple client-side intelligent agents equal in number to the multiple channels and at least one destination-side intelligent agent.

7. The computer-implemented method of claim 6, wherein the at least one destination-side intelligent agent is implemented as a web service.

8. A computing system for uploading a data file over multiple channels from a client computer to at least one remote destination computer, the computing system comprising:
    a client computer in operative communication with at least one remote destination computer;
    a data upload coordination product operative to control communication between the client computer and the at least one destination computer, the data upload coordination product including:
        means for dividing the data file into a plurality of file components, each file component comprising one or more file slots, wherein each said file component having a restart-capable cumulative hash and a restart-capable hash and each file slot having a restart-capable hash;
        means for controlling simultaneous transfer of multiple file slots, each file slot being transferred over one of the multiple channels, to upload the data file from client computer to the at least one remote destination computer;
        means for calculating, as the data file is transferred to the destination computer and based on the data file transferred to the destination computer, a destination-side file slot hash based upon the data in each file slot, a destination-side file component hash based upon the data in each file component, and a destination-side cumulative hash based upon the transferred data file;
        means for calculating a client-side cumulative hash based upon the data file resident on the client computer;
        means for comparing the destination-side and client-side cumulative hashes to verify integrity of the transferred file;
        means for determining, if the client-side and destination-side cumulative hashes fail to match, in which file slot and in which file component the error has occurred, whereby uploading of the data file is operable to be re-started beginning with the file slot and file component containing the error.

9. The computing system of claim 8, wherein the means for determining in which file slot and in which file component the error has occurred includes means for comparing the destination-side file component hash and the destination-side file slot hash with a client-side file component hash and a client-side file slot hash, respectively.

10. The computing system of claim 8, further comprising means to coordinate transfer of the data file among multiple remote destination computers.

11. The computing system of claim 10, wherein the means to coordinate transfer of the data file is a grid broker.

12. The computing system of claim 8, further comprising means of generating a culled slot corresponding to adjacent transferred data, wherein calculation of the destination-side cumulative hash is performed using the data corresponding to the culled slot.

13. The computing system of claim 8, wherein the means for controlling simultaneous transfer of multiple file slots includes multiple client-side intelligent agents equal in number to the multiple channels and at least one destination-side intelligent agent.

14. The computing system of claim 13, wherein the at least one destination-side intelligent agent is implemented as a web service.

15. A non-transitory computer readable medium having computer readable program code for uploading a data file over multiple channels from a client computer to at least one remote destination computer, the computer readable medium including:
- first computer program code for means for dividing the data file into a plurality of file components, each file component comprising one or more file slots, wherein each said file component having a restart-capable cumulative hash and a restart-capable hash and each file slot having a restart-capable hash;
- second computer program code means for controlling simultaneous transfer of multiple file slots, each file slot being transferred over one of the multiple channels, to upload the data file from client computer to the at least one destination computer;
- third computer program code means for calculating, as the data file is transferred to the destination computer and based on the data file transferred to the destination computer, a destination-side file slot hash based upon the data in each file slot, a destination-side file component hash based upon the data in each file component, and a destination-side cumulative hash as the data file is transferred from the client computer to the destination computer;
- fourth computer program code means for calculating a client-side cumulative hash based upon the data file resident on the client computer;
- fifth computer program code means for comparing, if the data file is completely uploaded, the destination-side and client-side cumulative hashes to verify integrity of the transferred file; and
- sixth computer program code means for determining, if the client-side and destination-side cumulative hashes fail to match, in which file slot and in which file component the error has occurred, whereby uploading of the data file is operable to be re-started beginning with the file slot and file component containing the error.

16. The computer readable medium of claim 15, wherein the sixth computer program code means includes program code means operative to compare the destination-side file component hash and the destination-side file slot hash with a client-side file component hash and a client-side file slot hash, respectively.

17. The computer readable medium of claim 15, further comprising seventh computer program code means including a grid broker to coordinate transfer of the data file among multiple remote destination computers.

18. The computer readable medium of claim 15, wherein the third computer program code means includes program code means operative to generate a culled slot corresponding to adjacent transferred data, wherein calculation of the destination-side cumulative hash is performed using the data corresponding to the culled slot.

19. The computer readable medium of claim 18, wherein the third computer program code means further includes additional program code means to save the destination-side cumulative hash state as metadata.

20. The computer readable medium of claim 15, further including multiple client-side intelligent agents equal in number to the multiple channels and at least one destination-side intelligent agent.

21. The computer readable medium of claim 20, wherein the at least one destination-side intelligent agent is implemented as a web service.

* * * * *